United States Patent
Meruva et al.

(10) Patent No.: US 9,786,276 B2
(45) Date of Patent: Oct. 10, 2017

(54) SPEECH ENABLED MANAGEMENT SYSTEM

(71) Applicant: Honeywell International Inc., Morristown, NJ (US)

(72) Inventors: Jayaprakash Meruva, Bangalore (IN); Bhabesh Chandra Acharya, Bangalore (IN); Sekhar Kommoju, Bangalore (IN); Steve Huseth, Plymouth, MN (US); Chandrakantha Reddy, Kurnool District (IN)

(73) Assignee: Honeywell International Inc., Morris Plains, NJ (US)

( * ) Notice: Subject to any disclaimer, the term of this patent is extended or adjusted under 35 U.S.C. 154(b) by 131 days.

(21) Appl. No.: 14/467,242

(22) Filed: Aug. 25, 2014

(65) Prior Publication Data
US 2016/0055848 A1 Feb. 25, 2016

(51) Int. Cl.
| G10L 15/22 | (2006.01) |
|---|---|
| G10L 15/19 | (2013.01) |
| H04N 7/18 | (2006.01) |
| H04N 5/232 | (2006.01) |

(52) U.S. Cl.
CPC ............... *G10L 15/22* (2013.01); *G10L 15/19* (2013.01); *H04N 5/232* (2013.01); *H04N 7/181* (2013.01); *G10L 2015/223* (2013.01)

(58) Field of Classification Search
CPC ............. G08B 13/19693; G10L 15/22; G10L 2015/223
See application file for complete search history.

(56) References Cited

U.S. PATENT DOCUMENTS

| 6,208,379 B1 * | 3/2001 | Oya | G08B 13/1968 348/143 |
|---|---|---|---|
| 6,310,629 B1 * | 10/2001 | Muthusamy | G06F 3/04815 704/246 |
| 6,359,892 B1 * | 3/2002 | Szlam | H04M 3/42229 370/401 |
| 7,444,284 B1 * | 10/2008 | Damiba | G10L 15/065 701/118 |

(Continued)

FOREIGN PATENT DOCUMENTS

CN 103035222 4/2013

OTHER PUBLICATIONS

Michaud, T. D., Pruehsner, W. R., & Enderle, J. D. (2000). Speak-n-See [voice actuated security camera for disabled persons]. In Bioengineering Conference, 2000. Proceedings of the IEEE 26th Annual Northeast (pp. 157-158). IEEE.1.*

*Primary Examiner* — Paras D Shah
*Assistant Examiner* — Bryan Blankenagel
(74) *Attorney, Agent, or Firm* — Brooks, Cameron & Huebsch, PLLC

(57) ABSTRACT

A speech-enabled management system is described herein. One system includes a grammar building tool configured to create a set of grammar keys based on ontology analytics corresponding to data received from a digital video manager (DVM) server, a speech recognition engine configured to recognize a speech command from a set of grammar files, a command translator configured to translate the recognized speech command to an executable command, and a processor configured to execute the speech command based on a particular grammar key from the set of grammar keys.

16 Claims, 3 Drawing Sheets

(56) References Cited

U.S. PATENT DOCUMENTS

| | | | |
|---|---|---|---|
| 7,791,466 B2* | 9/2010 | Agarwalla | G08B 13/19615 340/286.14 |
| 8,255,224 B2* | 8/2012 | Singleton | G10L 15/08 704/251 |
| 2002/0016971 A1* | 2/2002 | Berezowski | G08B 13/19693 725/105 |
| 2002/0020586 A1* | 2/2002 | Bauer | B66B 1/468 187/391 |
| 2002/0032564 A1* | 3/2002 | Ehsani | G06F 17/2775 704/235 |
| 2002/0059289 A1* | 5/2002 | Wenegrat | G06F 17/30734 |
| 2003/0023440 A1* | 1/2003 | Chu | G10L 15/19 704/249 |
| 2004/0037408 A1* | 2/2004 | Zandt | H04M 3/436 379/207.15 |
| 2005/0080632 A1* | 4/2005 | Endo | G10L 15/08 704/277 |
| 2005/0206513 A1 | 9/2005 | Fallon | |
| 2007/0005795 A1* | 1/2007 | Gonzalez | G06F 17/30017 709/232 |
| 2007/0050191 A1* | 3/2007 | Weider | G06F 17/30864 704/275 |
| 2007/0118357 A1* | 5/2007 | Kasravi | G06F 17/273 704/10 |
| 2009/0006097 A1* | 1/2009 | Etezadi | G10L 13/08 704/260 |
| 2009/0055178 A1* | 2/2009 | Coon | B60R 16/0373 704/246 |
| 2009/0228270 A1* | 9/2009 | Odell | G10L 15/1815 704/231 |
| 2009/0288011 A1* | 11/2009 | Piran | G08B 13/19693 715/720 |
| 2010/0125456 A1* | 5/2010 | Weng | G10L 15/22 704/251 |
| 2010/0312546 A1* | 12/2010 | Chang | G06N 99/005 704/9 |
| 2010/0318398 A1* | 12/2010 | Brun | G06F 17/2775 705/7.18 |
| 2012/0016670 A1* | 1/2012 | Khorashadi | G10L 15/26 704/231 |
| 2012/0307052 A1* | 12/2012 | Thiruvengada | H04N 7/183 348/143 |
| 2013/0088642 A1 | 4/2013 | Hsieh | |
| 2013/0124207 A1 | 5/2013 | Sarin et al. | |
| 2013/0183944 A1* | 7/2013 | Mozer | H04L 12/282 455/414.1 |
| 2013/0211710 A1* | 8/2013 | Kennewick | G06Q 30/0261 701/419 |
| 2015/0120297 A1 | 4/2015 | Meruva | |

* cited by examiner

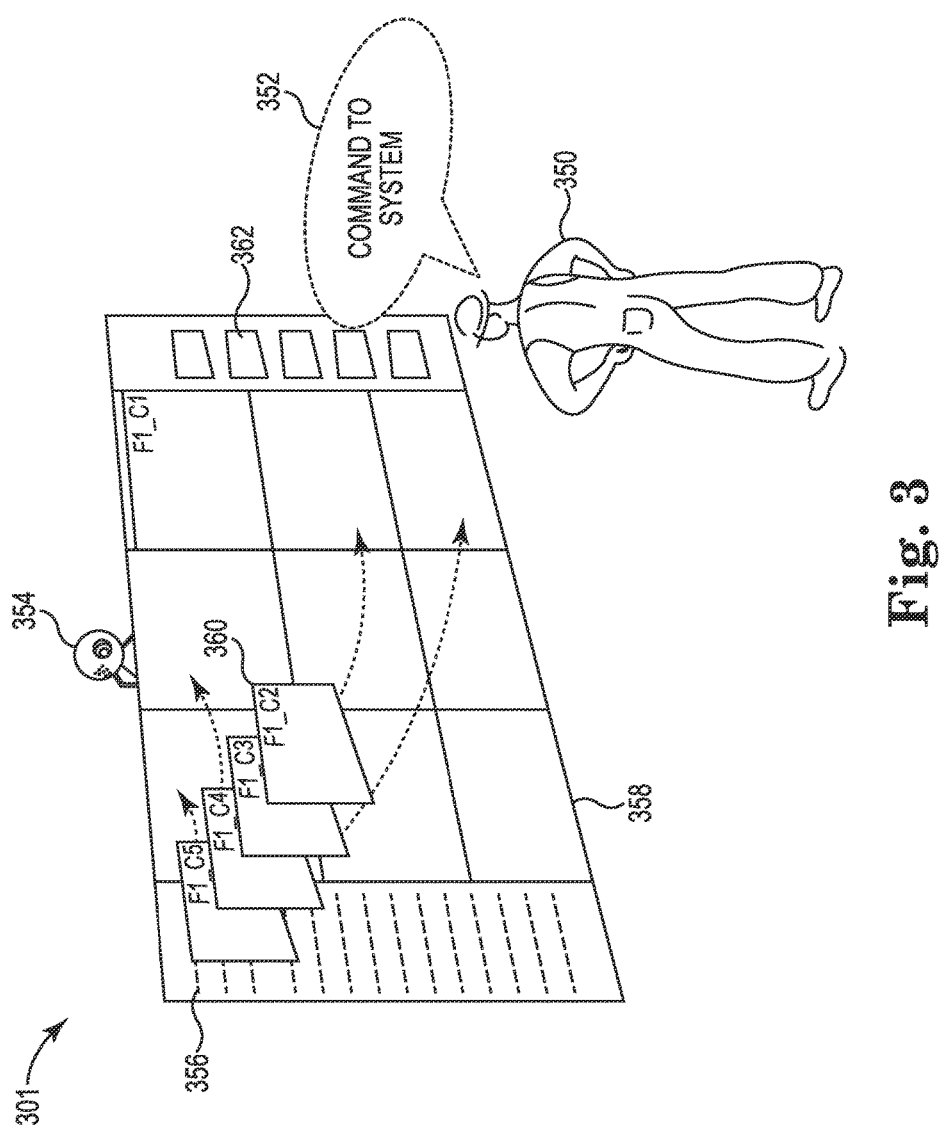

SPEECH ENABLED MANAGEMENT SYSTEM

TECHNICAL FIELD

The present disclosure relates to a speech enabled management system.

BACKGROUND

Video viewing and recording can offer an operator of a video surveillance system a manner in which to monitor and investigate incidents. Successful video recording and monitoring may depend upon a proper camera recording and/or viewing angle at a particular time. For example, video viewing can include an operator searching and requesting a particular camera in an area to view a specific location on a monitor.

In previous video surveillance system approaches, site management operations may be performed by an operator, which may include the operator having to remember exact camera numbers to request a particular camera for a particular location. Extensive training may be needed for operators in order to request the proper camera, thus, infrequent and/or non-trained operators may have difficulty requesting viewing and recording operations.

In some instances, to view multiple camera viewing angles, the operator may create a pre-defined viewing order on a monitor. However, during monitoring or an investigation, the pre-defined view may not match the exact grouping of cameras the operator is seeking. To correct the viewing problem, the operator may need to identify the correct camera quickly, but without the proper camera name being requested, a time delay or undue commissioning costs may occur.

BRIEF DESCRIPTION OF THE DRAWINGS

FIG. 3 illustrates a computing device for speech enabled management in accordance with one or more embodiments of the present disclosure.

DETAILED DESCRIPTION

Figure 1:
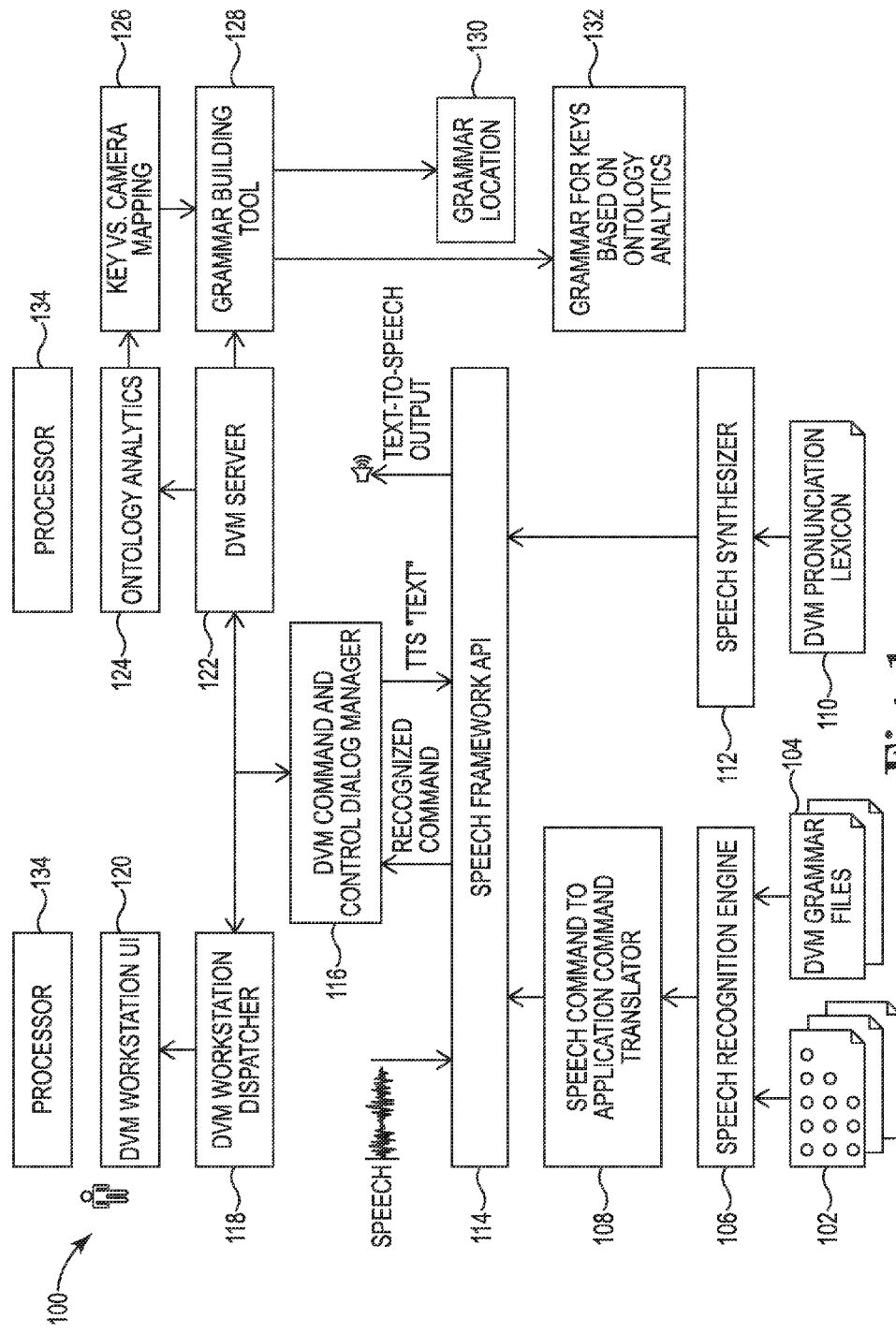
FIG. 1 illustrates a speech enabled management system in accordance with one or more embodiments of the present disclosure.

A speech enabled management system is described herein. For example, one or more embodiments a grammar building tool configured to create a set of grammar keys based on ontology analytics corresponding to data received from a digital video manager (DVM) server, a speech recognition engine configured to recognize a speech command from a set of grammar files, a command translator configured to translate the recognized speech command to an executable command, and a processor configured to execute the speech command based on a particular grammar key from the set of grammar keys.

Embodiments of the present disclosure can provide a video surveillance system operator with natural interaction with a video viewing and monitoring system. Further, embodiments of the present disclosure can provide effective and efficient functioning of the video viewing and monitoring system for the operator. Embodiments of the present disclosure can also decrease the amount of operations trainings needed to effectively operate the video viewing and monitoring system. For example, verbally requested camera views located in a particular area can be retrieved and placed upon a surveillance monitor for viewing. That is, identifying a camera associated with a camera view and/or location can more readily be identified and retrieved.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, mechanical, and/or electrical changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 126 may reference element "26" in FIG. 1, and a similar element may be references as 226 in FIG. 2.

As used herein, "a" or "a number of" something can refer to one or more such things. For example, "a number of components" can refer to one or more components.

FIG. 1 illustrates a speech enabled management system 100 in accordance with one or more embodiments of the present disclosure. An operator can provide verbal voice commands to the speech enabled management system 100 to retrieve and/or view a monitored location. As used herein, an operator can be a user, engineer, technician, or a security officer, among others. As used herein, a voice command can include a verbal request, spoken statement, and/or an utterance of words or sounds.

As shown in FIG. 1, system 100 can include operator voice training profiles 102. Operator voice training profiles 102 can include recordings of the voice of an operator, such as, in some instances, recordings of an operator speaking a collection of words. Recording the voice of an operator can build a voice profile such that the speech enabled management system 100 can subsequently recognize a voice command spoken by the operator. That is, an operator can have a voice profile that includes words, sentences, and/or example commands.

In some embodiments, the operator voice training profiles 102 can include operator specific voice models. Voice models may contain acoustic models that can be based on an utterance of words. Based on the operator, a speech recognition engine 106 of system 100 can use the voice models for recognition. In some examples, the same voice model can be used for multiple operators. For example, a similar utterance of words within a particular context can be applied to all operators, or a select few. In some examples, a voice model can be applied to user who speak with a similar accent.

As shown in FIG. 1, system 100 can include Digital Video Manager (DVM) grammar files 104. DVM grammar files 104 can include two forms of grammar applications. In some embodiments, the speech enabled management system 100 can include the set of grammar keys that correspond to a particular project. "Fixed" grammar can be for applications that remain constant during application execution. That is, fixed grammar remains constant throughout the applications. For example, an operating command "camera 1" can refer to a first camera. In some embodiments, fixed grammar can be shipped with the product.

A second form of grammar application can include "runtime" grammar. Runtime grammar can be grammar that is specific to a project, site, building, or facility. That is, runtime grammar can change from project to project and may not remain constant. For example, runtime grammar can be a first type of grammar for a first project, or a second type of grammar for a second project. For example, floor 1 may refer to a first floor in a first project, while floor 1 may refer to a basement level in a second project. Thus, depending on the project, runtime grammar can vary.

The speech recognition engine 106 can receive information from the operator voice training profile 102 and/or the DVM grammar files 104. The speech recognition engine 106 can receive a speech command from an operator, and recognize the speech command based on the operator voice training profile 102 and/or DVM grammar files 104. For instance, in some embodiments, speech recognition engine 106 can be based on operator voice training profile 102 or a speech pattern. The speech recognition engine 106 can identify the command based on the operator training profile 102.

In some embodiments, speech recognition engine 106 can identify the speech command based on phonology, morphology, syntax, semantics, and lexicon language aspects. That is, the particular speech patterns of an operator may be analyzed and uniquely identified based on the specific operator. For example, the operator may have a speech impediment or heavy speech accent from which the words may sound differently than a different speech region. The speech recognition engine 106 can decipher the speech command based on the different speech attributes. For instance, the speech recognition engine 106 can determine whether a command is requesting "main" floor or "first" floor based on the spoken attributes (e.g., syntax, semantics, etc.).

In some embodiments, the speech enabled management system 100 can include a speech command to application command translator 108, which can translate the spoken word into text. For example, the speech command to application command translator 108 can translate an identified operator's spoken word into a form of computer speech recognition. That is, the speech command to application command translator 108 can receive the identified voice command and create a speech to text translation. For instance, an operator may command "start recording" or "begin recording." Both commands correspond to a recording action to be initiation. The speech command to application command translator 108 can map the speech commands to a recording initiation application command. This it, the speech command to application command translator 108 can map a speech command to a recognized command. A recognized command can include an executable command, meaning the recognized command is one that can be executed by the system.

In some embodiments, the speech enabled management system 100 can include a speech synthesizer 112. The speech synthesizer 112 can translate text to speech signals and/or transfer the speech signals to a speaker. For example, the speech synthesizer 112 can receive the speech text information and transform the speech text into a speech signal, which can be played over a speaker. That is, the speech enabled management system 100, can, in such a manner, communicate verbally to the operator.

In some embodiments, a pronunciation lexicon 110 can assist the speech synthesizer 112 with pronunciation phonemes associated with domain terms. That is, the pronunciation lexicon 110 contains information regarding how a word should be pronounced when a speech synthesizer 112 translates a set of words and/or text to voice. For example, the operator may issue a command for camera number 115. The pronunciation lexicon 110 can provide information regarding pronunciation of the words when the speech synthesizer 112 translates the command into speech. The system may determine camera number 115 does not exist and a comparable camera grammatically similar may not be identified. Thus, the speech synthesizer can send a speech signal to transfer communication to a speaker and inform the operator of the identification failure.

In some embodiments, a speech framework API 114 of system 100 can receive the translated speech command (e.g., recognized, application command) from the speech command to application command translator 108 and/or text to voice from the speech synthesizer 112. The speech framework API 114 can access operational services, such as the speech recognition engine 106 and speech command to application command translator 108 based on a current configuration. That is, the speech framework API 114 can access the deciphered speech command from the speech command to application command translator 108 to assist with mapping to an applicable command.

In some embodiments, the speech enabled management system 100 can include a command and control dialog manager (CCDM) 116. The CCDM can receive the recognized command from the speech framework API 114. The CCDM can interpret the received command and plan a future response. The CCDM can communicate with other modules in the system to perform actions for functionality purposes. That is, the CCDM can monitor the speech enabled management system 100 and communicate with modules to determine a future response, such as requesting an additional command or initiating a camera view retrieval.

In some embodiments, the CCDM can determine whether the speech command is applicable for a current context. For example, an operator may command viewing a basement or lower level of a building, but the building may not have a basement or lower level. Or, if an operator attempts to perform a pan/tilt/zoom (PTZ) operation on a camera that does not support PTZ capabilities. Or, if an operator tries to view a video on a surveillance monitor 4, but surveillance monitor 4 is not available. Thus, based on the current context within the prior examples, the command would be nonsensical. The control dialog manager 116 can determine the particular speech command is not applicable for the current context. Alternatively, if the operator commands an applicable command based on a current context, such as a main level or first level, the system 100 can retrieve the cameras associated with the particular level because the current context is applicable.

In some embodiments, the DVM CCDM 116 can send the command to a DVM server 122 of system 100 to select an applicable camera, camera view, and/or location associated with the command. A grammar building tool 128 of system 100 can create a set of grammar keys based on ontology analytics 132. Ontology analytics 124 can include data analytics over server data to infer and associate data elements. That is, ontology analytics 124 can make inferences and associate two or more data elements. To determine an applicable camera, camera view, and/or location associated with the command, ontology analytics 124 can receive camera data from DVM server 122 and generate a key to list of camera details 126. The key can be an associated characteristic. For example, a key can be a building location, characteristic of a camera, a view angle, etc. That is, the grammar building tool 128 can create a grammar location 130 associated with a camera. For instance, "floor 1" cameras are mapped to a floor 1 key, and PTZ cameras are mapped to PTZ key, etc., the key being a location, and a grammar location can be created based on the key. Cameras within the location can be associated with the grammar location.

Grammar building tool 128 can create the set of grammar keys 132 based on ontology analytics corresponding to data. Data can include the voice training profile 102 information, speech patterns, grammar files 104, pronunciation lexicon 110, the speech synthesizer 112 speech to text information, translated command 108, the recognized command from the speech framework 114, and/or speech that may be associated with cameras within a location. In some embodiments, the grammar keys and the mappings can be extracted from the ontology analytics 124.

In some embodiments, the current applicable context can include translating a grammar key from the set of grammar keys based on the speech command. That is, grammar building tool 128 can use the grammar key to generate grammar for the speech recognition engine 106. For instance, an operator can command "show all floor 1 cameras." The DVM CCDM 116 can retrieve a list of cameras from the mapping table and display the camera views onto a workstation surveillance monitor. That is, based on the command, the grammar extracted from the command can request particular cameras or cameras within a location to be displayed on a surveillance monitor.

In some embodiments, the set of grammar keys can correspond to a particular project, and the grammar building tool 128 can change the set of grammar keys based on a change to the particular project. That is, grammar keys associated with a particular project can be changed. For example, in a first project, grammar associated with a "lower level" may be associated with cameras located on a basement level. Alternatively, in a second project, grammar associated with a "lower level" may be associated with cameras located on a first floor if a basement level is not present.

In some embodiments, a speech interface technology, in addition to the ontology analytics 124 and location based camera grouping analytics within the speech enabled management system 100, can use an operator voice command to perform DVM operations. That is, an operator voice command can request a particular camera, view, start/stop recordings, system operations, and regular camera audits, among other functions.

The grammar building tool 128 can create a grammar file 104 including runtime grammar (e.g., grammar that is relevant to a specific project). For example, a hotel building may have language that is relevant to the hotel building, such as "guest lobby" and "baggage check," as opposed to a stock market exchange building, which may include grammar relevant to "stock floor" or "trade area."

In some embodiments, the ontology analytics 124 can be based on ontological factors, including dialect and region. For example, the operator may use different words to describe a location typically known in a particular region with a different name. That is, gender, personality, culture, and experiences may influence the specific command language an operator uses. For example, one region of the world may refer to a hotel lobby as a "grand room" while another segment of the world may refer to the hotel lobby as the "social banquet." Ontology analytics 124 can be used to decipher the differences and find the proper camera associated with a location (e.g., key and location). Here, ontology analytics 124 can decipher both "grand room" and "social banquet" as corresponding to hotel lobby.

In some embodiments, the DVM server 122 can receive, from the ontology analytics 124 and/or the grammar building tool 128, key and camera mapping 126 information. The DVM server 122 can send the information to the DVM workstation dispatcher 118, executing the speech command based on the translated grammar key. The DVM workstation dispatcher 118 can send the commanded camera view to the workstation user interface (UI) 120 for an operator to view.

In some embodiments, the CCDM 116 can manage a state and context of a workstation UI 120 that is used while executing voice commands. For example, the CCDM 116 can maintain which selected surveillance monitor to display the camera view upon. Additionally, or alternatively, a selection of a monitor can be chosen via voice, keyboard, touchscreen, etc.

In some embodiments, the grammar building tool 128 can include a plurality of grammar files (e.g., fixed and runtime) associated with recognition grammar, features, and location. That is, the grammar files can include a set of rules and layouts relevant to cameras, locations, and/or camera angles. That is, the rules can provide guidelines for which cameras, locations, and camera angles identify with a particular command. For example, cameras associated with a tenth floor of a building may be numbered in the thousands (e.g., camera number 1001, camera number 1002, etc.). A set of rules can establish a command relating to the tenth floor can request all cameras associated with camera number 10XX. Additionally, or alternatively, the tenth floor cameras can also be included within a camera audit, upper floor commands, hallways, etc. Thus, it is possible for a set of rules to associate a single camera with multiple commands.

As will be discussed in further detail in FIG. 2, in some embodiments, the set of grammar keys can correspond to a camera located within a particular area. That is, a key can be mapped to a particular location. In some embodiments, the set of grammar keys can command the camera in a sequential or mapping order. For example, commanding a camera audit can in turn bring a sequence of cameras on the surveillance monitor. The operator can view the sequence of cameras on the surveillance monitor.

The speech enabled management system 100 can include a processor 134 connected to a memory resource, e.g., a computer-readable medium (CRM), machine readable medium (MRM), database, etc. In some examples, memory resource may be a non-transitory storage medium, where the term "non-transitory" does not encompass transitory propagating signals. The memory resource can include a number of computing modules. The example of FIG. 1 shows a plurality of modules (e.g., 108, 112, 116, etc.). As used herein, a computing module can include program code, e.g., computer executable instructions, hardware, firmware, and/or logic. But the computing module at least includes instructions executable by the processor 134, e.g., in the form of modules, to perform particular actions, tasks, and functions described in more detail herein in reference to FIG. 1, FIG. 2, and FIG. 3. Instructions executable by the processor 134 associated with a particular module, e.g., modules 108, 112, 116, etc., can also be referred to and function collectively as a component and/or computing engine. As used herein, an engine can include hardware firmware, logic, and/or executable instructions. But the computing module 106 at least includes software e.g., logic in the form of an application specific integrated circuit (ASIC), to perform particular actions, tasks and functions described in more detail herein in reference to FIG. 1, FIG. 2, and FIG. 3.

Engines and/or the number of modules, e.g., 106 and 112, shown in FIG. 1, can be sub-engines/modules of other engines/modules and/or combined to perform particular actions, tasks, and functions within a particular system and/or computing device.

Engines and/or modules described herein can be located in a single system and/or computing device or reside in separate distinct locations in a distributed computing environment, e.g., cloud computing environment. Embodiments are not limited to these examples.

Figure 2:
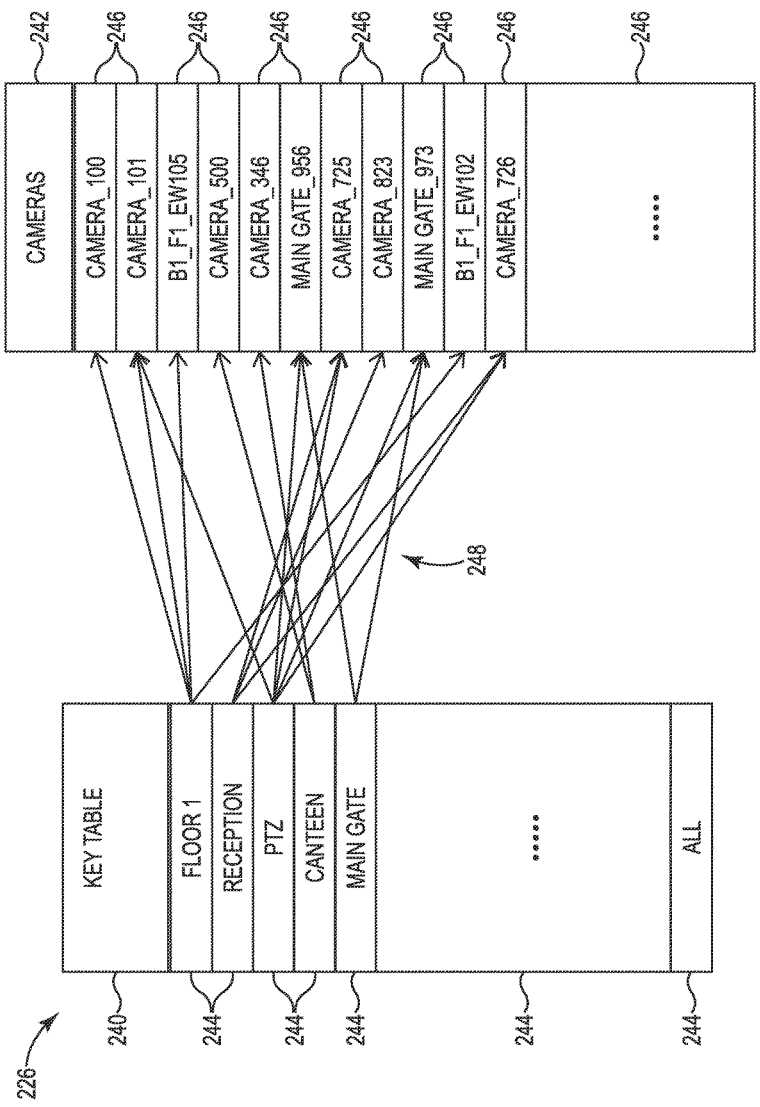
FIG. 2 illustrates a key and camera mapping in accordance with one or more embodiments of the present disclosure.

FIG. 2 illustrates a key and camera mapping 226 in accordance with one or more embodiments of the present disclosure.

As shown in FIG. 2, and analogous to the key vs. camera mapping module 126 in FIG. 1, key and camera mapping 226 can associate (e.g., map) 248 a location 244 in key table 240 with a camera 246 or tile location in camera table 242. The location 244 of a camera can be a specific location within or near a building. That is, a camera or cameras associated with a specific area can include a similar mapping key within a table.

In some embodiments, translating the grammar key can include mapping the speech command to a location 244 in key table 240 and a camera 246 in table 242. That is, based on a particular project and/or command, the grammar files can associate a command with an action (e.g., selection of camera). For example, camera names and location rules can be generated dynamically by a reading configuration from a DVM server. The commands can include requesting cameras to be displayed on a particular surveillance monitor, or in a particular format. For example, an operator can command camera 2 to be displayed on surveillance monitor 5. In response, the camera name and location rules within the grammar files can display camera 2 on surveillance monitor 5.

FIG. 3 illustrates a speech enabled management system 301 in accordance with one or more embodiments of the present disclosure.

As previously discussed in FIG. 2, the speech enabled management system 301 can include creating the set of grammar keys based on ontology analytics including a mapping table that associates a location to a particular camera and/or camera view 360.

In some embodiments, the speech enabled management system 301 method can identify the speech command 352 issued by an operator 350 by deciphering the speech command from a plurality of pronunciation speech lexicons. That is, the operator 350 may have a particular speech pattern or vocabulary associated with individual cameras or locations, from which the speech enabled management system 301 can decipher. For example, the operator 350 may command viewing cameras located in the "basement," "lower level," or "ground floor" of a building, each of which may correspond to similar cameras with particular camera angles. That is, a command of "lower level" or "ground floor" may retrieve the same cameras that depict camera angles showing the basement of the building.

As illustrated in FIG. 3, in some embodiments, the executed speech command 352 can be performed at a workstation that includes a surveillance monitor, video, console, or microphone. For example, the operator 350 can command 352 a camera view via the microphone 354.

In some examples, executing the speech command 352 can include commanding a particular camera, view, audit, recording, or operational task. For example, an operator 350 can command 352 a location to view via the microphone 354. The speech enabled management system 301 can retrieve the camera(s) view(s), and display the camera view(s) across a surveillance monitor 358, which the operator can view. In some instances, the operator 350 can command an audit, sequence, pan, zoom, tilt, or multiple camera angles. The speech enabled management system 301 can retrieve the multiple camera angles 360 and place sequentially or in a pre-defined ordered fashion across the surveillance monitor 358. In some embodiments, the sequence of camera angle can appear in sequential order 362 along an edge of a surveillance monitor 358. For example, operational tasks, such as camera control operations that include pan, tilt, zoom, start, stop, tour, audit, etc. operations, can appear along the edge of the surveillance monitor 358.

In some embodiments, the speech enabled management system 301 can display on surveillance monitors 358 and/or automatically change a number of camera tile views (e.g., 360) on the surveillance monitors 358 based on a number of cameras. For example, an operator 350 can command 352 an audit performance. The cameras associated with a building can be ordered and displayed on the surveillance monitor 358. This can assist an operator 350 in determining whether any cameras are failing or broken if a camera view 360 (e.g., picture, screen, recording) does not appear clearly on the surveillance monitor 358.

In some embodiments, the surveillance monitor 358 can include additional options 356, such as text, menu, and/or a set of choices, displayed on the surveillance monitor 358 for an operator 350 to interact. The additional options can be a source of information for the operator 350 for reference purposes in addition to speech feedback (e.g., text to speech). For example, an infrequent operator can command 352 a live feed of all cameras within the building to be displayed upon the surveillance monitor 358 in a 3×3 fashion. The additional options 356 can be displayed on the surveillance monitor for operator 350 ease, such that a list of capabilities can be easily identified. For instance, the additional options 356 can indicate to the operator 350 a textual listing of locations, cameras, angles, times, audits, etc. The speech enabled management system 301 can indicate a success and/or failure of the commands verbally and/or textually across the surveillance monitor 358. The speech synthesizer 112, as discussed in FIG. 1, can synthesize the text to speech signals, and transfer the signals to the speakers.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A speech-enabled surveillance management system, comprising:
   a grammar building tool configured to create a set of grammar keys based on ontology analytics corresponding to data received from a digital video manager (DVM) server and including a mapping table that associates each of a plurality of locations to at least one camera located within a particular facility, wherein the set of grammar keys corresponds to the particular facility, and wherein a first set of the grammar keys are for applications of the particular facility that remain constant during application execution and a second set of the grammar keys changes based on a change of the particular facility from a first facility to a second facility;
   a speech recognition engine configured to recognize a speech command from a set of grammar files;
   a control dialog manager configured to determine, upon recognizing the speech command, that the recognized speech command is applicable for a current facility context;
   a command translator configured to translate, upon determining the recognized speech command is applicable, the recognized applicable speech command to an executable command by mapping the speech command to a location and a particular camera associated with the location based on the mapping table and recognized speech command, wherein the location is a physical location within the particular facility and the recognized speech command comprises the location; and
   a processor configured to:
      execute the speech command;
      display a video feed of a portion of the facility by a monitor based on the executed speech command and the particular camera associated with the location.

2. The system of claim 1, further comprising a speech synthesizer configured to identify and select a pronunciation lexicon based on pronunciation phonemes associated with domain terms.

3. The system of claim 1, wherein the speech recognition engine is based on operator voice training profile or a speech pattern.

4. The system of claim 1, wherein the ontology analytics are based on ontological factors, including inferences and associations between two data elements.

5. The system of claim 1, wherein the DVM server includes camera configuration data, location data, and system configuration data.

6. The system of claim 5, wherein the set of grammar keys is configured to:
   correspond to a camera located within a particular area and control the camera in a sequential or mapping order; and
   control a set of operations, wherein the set of operations include pan, tilt, zoom, start, stop, recording, clear, monitor, and tile features.

7. The system of claim 1, wherein the executed speech command is performed at a workstation that includes a surveillance monitor, video, console, or microphone.

8. A method for operating a speech-enabled surveillance management system, comprising:
   creating a set of grammar keys from a plurality of grammar files, wherein the set of grammar keys corresponds to a particular facility, and wherein a first set of the grammar keys are for applications of the particular facility that remain constant during application execution and a second set of the grammar keys changes based on a change of the particular facility from a first facility to a second facility, and wherein creating the set of grammar keys is based on ontology analytics including a mapping table that associates each of a plurality of locations to at least one camera located within the particular facility;
   identifying a speech command;
   determining, upon identifying the speech command, whether the speech command is applicable for a current facility context; and
   upon determining that the identified speech command is applicable for the current facility context:
      translating a grammar key from the set of grammar keys based on the speech command, wherein translating the grammar key includes mapping the speech command to a location and a particular camera associated with the location based on the mapping table and identified speech command, wherein the location is a physical location within the particular facility and the identified speech command comprises the location; and
      executing the speech command based on the translated grammar key; and
   displaying a video feed of a portion of the facility by a monitor based on the executed speech command and the particular camera associated with the location.

9. The method of claim 8, wherein the method includes identifying the speech command by deciphering the speech command from a plurality of pronunciation speech lexicons.

10. The method of claim 8, wherein executing the speech command includes commanding a particular camera, view, audit, recording, or operational task.

11. A speech-enabled surveillance management system, comprising:
   a grammar building tool configured to create a set of grammar keys based on ontology analytics corresponding to a set of data received from a DVM server and including a mapping table that associates each of a plurality of locations to at least one camera located within a particular facility, wherein the set of grammar keys corresponds to the particular facility, and wherein a first set of the grammar keys are for applications of the particular facility that remain constant during application execution and a second set of the grammar keys changes based on a change of the particular facility from a first facility to a second facility;
   a speech recognition engine configured to recognize a speech command from a set of grammar files;

a control dialog manager configured to determine, upon recognizing the speech command, that the recognized speech command is applicable for a current facility context;

a command translator configured to translate, upon determining the recognized speech command is applicable, the recognized applicable speech command to an executable speech command by mapping the speech command to a location and a particular camera associated with the location based on the mapping table and recognized speech command, wherein the location is a physical location within the particular facility and the recognized speech command comprises the location; and a processor configured to:
   execute the speech command; and
   display a video feed of a portion of the facility by a monitor based on the executed speech command and the particular camera associated with the location.

12. The system of claim 11, wherein the grammar building tool includes a plurality of grammar files associated with recognition grammar, features, and location.

13. The system of claim 11, wherein the speech synthesizer is configured to synthesize text to speech signals and transfer the speech signals to a speaker.

14. The system of claim 11, wherein the speech recognition engine is configured to identify the speech command based on phonology, morphology, syntax, semantics, and lexicon language aspects.

15. The system of claim 11, further comprising displaying camera views on surveillance monitors and automatically changing a number of camera tile views on the surveillance monitors based on a number of cameras.

16. The system of claim 11, wherein the mapping table associates a location in a key table with a camera or tile location in a camera table.

* * * * *